United States Patent [19]
Kistler

[11] 3,801,838
[45] Apr. 2, 1974

[54] PIEZOELECTRIC PRESSURE TRANSDUCER

[75] Inventor: Walter P. Kistler, Redmond, Wash.

[73] Assignee: Sundstrand Data Control, Inc., Redmond, Wash.

[22] Filed: May 19, 1972

[21] Appl. No.: 255,191

[52] U.S. Cl. .................................. 310/8.7, 310/9.1
[51] Int. Cl. ............................................ H04r 17/00
[58] Field of Search ............... 310/8.7, 8.3, 9.1, 8.8

[56] References Cited
UNITED STATES PATENTS

| | | | |
|---|---|---|---|
| 3,546,497 | 12/1970 | Craster | 310/9.1 X |
| 3,171,989 | 3/1965 | Hatschek | 310/8.7 |
| 3,461,327 | 8/1969 | Zeiringer | 310/8.7 X |
| 3,150,274 | 9/1964 | Pischinger | 310/8.7 X |
| 3,360,664 | 12/1967 | Straube | 310/9.1 X |
| 2,405,472 | 8/1946 | Tuttle | 310/8.7 UX |
| 3,382,841 | 5/1968 | Bouyoucos | 310/9.1 X |
| 3,158,763 | 11/1964 | Busch et al. | 310/8.7 |
| 2,917,642 | 12/1959 | Wright et al. | 310/8.7 X |

*Primary Examiner*—J. D. Miller
*Assistant Examiner*—Mark O. Budd
*Attorney, Agent, or Firm*—Hofgren, Wegner, Allen, Stellman & McCord

[57] ABSTRACT

A piezoelectric pressure transducer particularly adapted for measuring fluid pressure up to and above ballistics levels of the order of 75,000 pounds per square inch with an accurate, linear response over a wide pressure range. The piezoelectric sensing element is housed in a cylindrical sleeve which is threaded into a wall of the chamber within which the pressure to be measured is developed. An end wall extending across the end of the sleeve is exposed to the pressure and deflects, compressing the piezoelectric element to generate an electric signal representing the pressure. A supporting wall for the end wall is located between the sensing element and the housing sleeve. Two flexure zones are formed in the end wall, one between the piezoelectric element and the supporting wall and the other between the wall and the sleeve. The supporting wall is connected with the end wall through a third flexure zone. The compliance of the supporting wall is less than the compliance of the piezoelectric element but greater than the compliance of the housing sleeve. Deformation of the housing sleeve, as by pressure on the mounting threads, is accommodated by the flexure areas and error creating stress on the piezoelectric element is minimized.

17 Claims, 5 Drawing Figures

PATENTED APR 2 1974  3,801,838

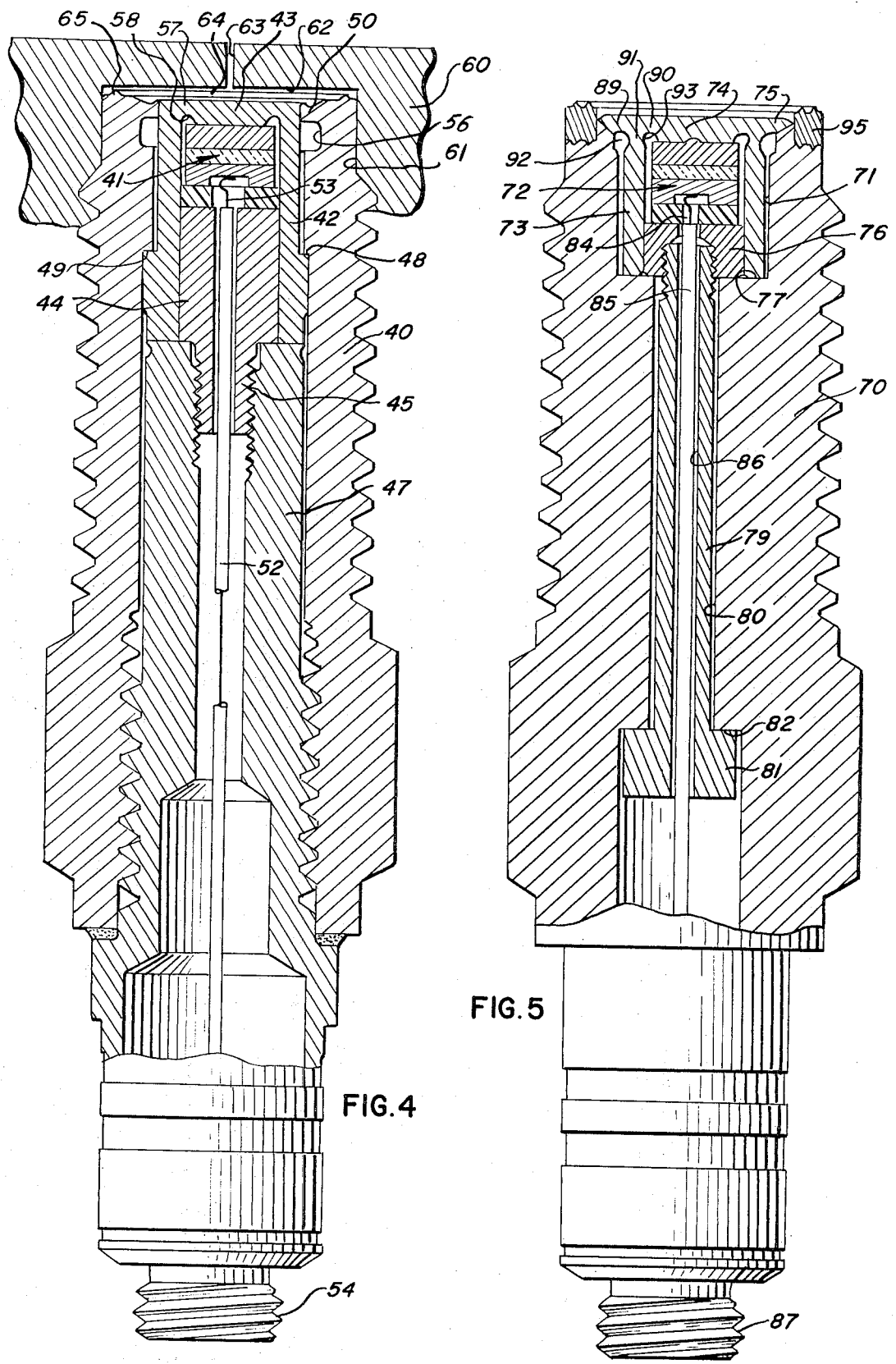

PIEZOELECTRIC PRESSURE TRANSDUCER

This invention is concerned with a piezoelectric pressure transducer for the measurement of fluid pressures and particularly high level pressures, with high frequency variations and fast rise times, as in the study of blasts, explosions, shock waves and the like which may be encountered, for example, in the investigation of internal ballistics.

The signal voltage developed by deformation of a quartz piezoelectric pressure transducer has an extremely linear relationship with the deforming pressure. The quality and performance of piezoelectric pressure transducers is determined largely by the design of the housing for the sensing element and the mechanism through which the pressure forces are applied to the element.

An early form of pressure transducer has a metal cup, generally of steel, in which the piezoelectric element was located. The front end of the cup is exposed to the pressure to be measured and is of the thickness such that it will deflect or comply slightly under load and transfer a pressure to the sensing element. The outer surface of the housing is threaded and is directly mounted in the wall of a chamber within which the pressure is developed. This form of transducer is subject to inaccuracies resulting primarily from stresses set up in the wall of the cup during installation and, where temperature changes occur, caused by differences in the temperature coefficients of expansion of the transducer housing and the chamber. The end of the cup, being rigid and integral with the cup wall, responds to any deformation of the cup wall, applying a pressure to the transducer element.

Current piezoelectric pressure transducer design is illustrated in Kistler U.S. Pat. No. 3,349,259. The transducer element is located within a thin walled cup which is stressed axially to provide a compressive preload on the element. The cup is located within a cylindrical open ended mounting sleeve and a thin metal diaphragm is welded to the end of the sleeve and to the end of the cup. The thin diaphragm effectively isolates the transducer element from stresses in the wall of the mounting sleeve, but is subject to damage when exposed to the high pressures of ballistics testing. With repeated use the diaphragm separates from its support on the mounting sleeve and from the end of the piezoelectric element pre-loading cup causing erratic operation.

The present invention provides control of the flexure of the transducer end wall enabling the use of an end wall which will withstand the high ballistics pressures and respond linearly to them but which effectively isolates the transducer element from stresses in the housing sleeve.

One feature of the invention is that the transducer includes a piezoelectric sensing element, a mounting sleeve surrounding the element, an end wall secured across the end of the sleeve, and means supporting the end wall, between the sensing element and the sleeve. More particularly, an annular supporting wall surrounds the piezoelectric sensing element, within the mounting sleeve, providing an intermediate support for the end wall.

Another feature is that the compliance (deformation as a result of applied pressure) of the intermediate wall is less than that of the piezoelectric element but greater than that of the mounting sleeve.

A further feature is that the end wall has two annular flexural areas located between the piezoelectric sensing element and the mounting sleeve. The dual flexure areas enable use of an end wall which can withstand ballistics pressures, yet moves freely in response to applied pressures and effectively isolates the transducer element from stresses in the mounting sleeve.

Still another feature of the invention is that the supporting wall is joined with the end wall between the two flexure areas.

And a further feature of the invention is that a third flexure area is provided in the supporting wall where it joins the end wall.

Further features and advantages of the invention will readily be apparent from the following specification and from the drawings, in which:

FIG. 4 is a longitudinal section through one embodiment of a transducer incorporating the invention; and FIG. 5 is a longitudinal section through a preferred embodiment of a transducer incorporating the invention.

Figure 1:
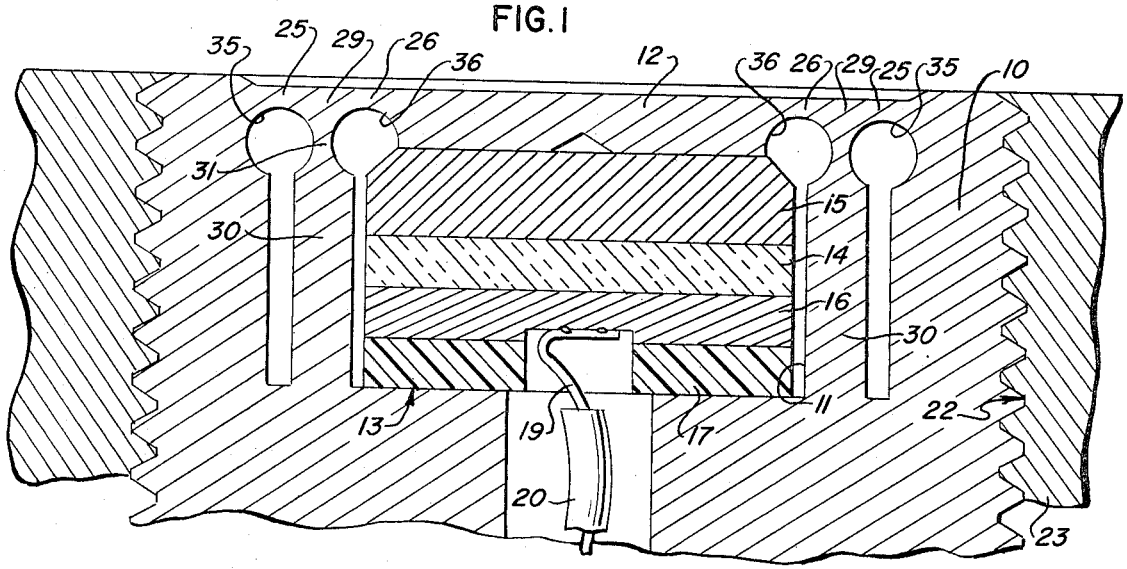
FIG. 1 is a diagrammatic longitudinal sectional view of a transducer illustrating an embodiment of the invention.
Figure 2:
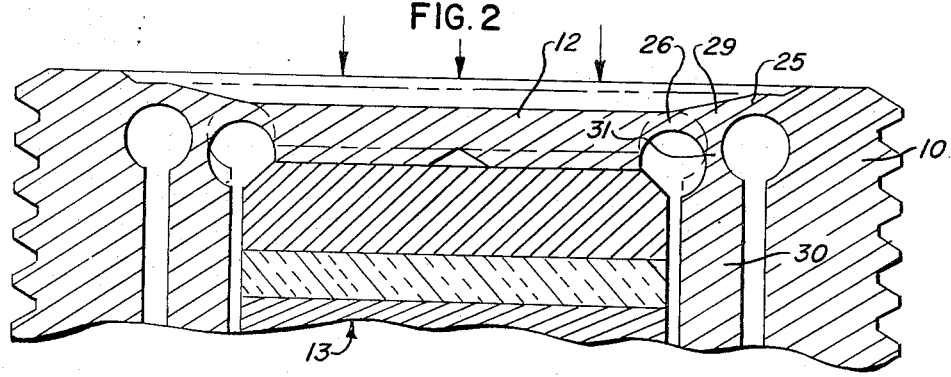
FIG. 2 is a view similar to FIG. 1 showing the end wall deflected by an applied pressure.
Figure 3:
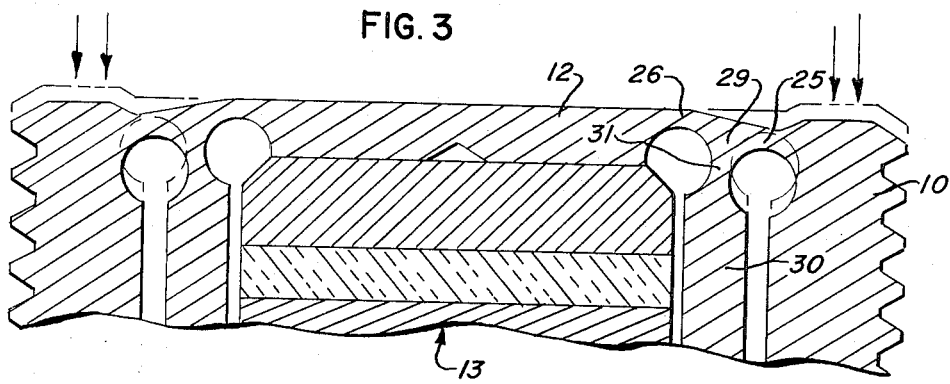
FIG. 3 is a view similar to FIG. 1 showing the mounting sleeve deformed by an external force.

FIGS. 1 through 3 illustrate diagrammatically the novel transducer construction which affords linear response to applied pressure and isolation from mounting stresses without the mechanical shortcomings of the welded diaphragm. Mounting sleeve 10 has therein a cavity 11 closed by an end wall 12. A piezoelectric sensing assembly 13 is located within cavity 11, and as shown here includes piezoelectric element 14 sandwiched between a conductive front plate 15 and a conductive electrode 16 which is isolated from the mounting sleeve 10 by an insulator 17. Electrode 16 has connected thereto the conductor 19 of a cable 20 through which the transducer is connected with a suitable amplifier, indicator, recorder or the like. The circuit is completed through front plate 15, end wall 12 and mounting sleeve 10. Pressure applied to the end wall 12 is transmitted directly to the piezoelectric element 14 establishing a charge across the element which is directly related to the pressure.

Piezoelectric element 14 has a circular disc configuration and the mounting sleeve 10 is a right circular cylinder which is threaded on its outer surface for mounting in a threaded bore 22 in the wall 23 defining a chamber within which the pressure being measured is developed.

End wall 12 has two radially spaced, annular flexure zones 25 and 26 which join the center of the end wall with the mounting sleeve. The flexure zones are more flexible than the central portion of the end wall or the mounting sleeve so that any deformation resulting from applied pressure is localized in the flexure zones.

The circular region 29 between flexure zones 25 and 26 is provided with support means resisting its deformation. An annular wall 30 surrounds the piezoelectric element assembly 13 and is spaced inwardly from the mounting sleeve 10. Supporting wall 30 is joined with end wall 12 by an annular flexure zone 31.

The reaction of the transducer when end wall 12 is subjected to a pressure is illustrated in FIG. 2. End wall 12 is deflected inwardly transmitting the pressure to the piezoelectric element assembly 13. The strain in the end wall 12 is concentrated in the two flexure zones, with the outer zone 25 undergoing a positive or outwardly convex curvature and the inner flexure area 26 undergoing a negative or outwardly concave curvature. Conversely, a deformation of the mounting sleeve 10, FIG. 3, has negligible effect on end wall 12 and the piezoelectric sensing assembly 13. The most common deformation of the mounting sleeve occurs as a result of tightening the sleeve in a threaded bore, compressing the sleeve from the broken line to a solid line position of FIG. 3 because the solid portion 29 tilts on supporting flexure zone 31. Here, the outer flexure zone 25 has a negative curvature, convex outwardly while the inner flexure zone 26 has a positive curvature, concave outwardly.

In both the conditions of FIGS. 2 and 3, supporting wall 30 and the third flexure zone 31 restrain the intermediate area 29 between the flexure zones 25 and 26 providing a smooth transition in the deformation of the end wall, isolating the center portion of the end wall from the mounting sleeve. In FIG. 2 flexure zone 31 is inclined inwardly while in FIG. 3 it is inclined outwardly, in both cases tending to remain on a line at right angles to the region 29 of the end wall between the flexure zones 25 and 26.

The intermediate supporting wall 30 has a compliance characteristic which is related to the compliance of the piezoelectric sensing assembly 13 and the surrounding mounting sleeve 10. The term "compliance" as used herein means the axial deformation per unit of axial load. The compliance of supporting wall 30 is less than that of the piezoelectric sensing assembly 13 and greater than that of the mounting sleeve 10. The appropriate characteristic may be established, for example, by selecting the thickness of the wall. If the spacing between the intermediate supporting wall 30 and the piezoelectric sensing element 13 is approximately equal to the spacing between the wall and mounting sleeve 10, the compliance of the wall should be the arithmetic mean of the compliance characteristics of the sensing assembly and mounting sleeve. If the spacings are greatly different, the compliance of the supporting wall should be adjusted in accordance with the spacing ratio.

Flexure areas 25, 26 and 31 are provided by thinning the wall material as by formation of the annular cutouts 34 and 35 of circular cross-section. These cutouts are preferably formed on the inner surface of end wall 12 leaving the outer surface generally planar.

The piezoelectric sensing assembly 13 may take different forms. The sensing element 14 may be of quartz or other suitable material, as lithium niobate, for example. Front plate 15 may in some instances be eliminated if the sensing element does not require mechanical or thermal protection. Insulator 17 might be replaced by a second piezoelectric element reversely connected so that the charge which it develops adds to that of element 14. Additional piezoelectric elements might be provided as shown in the aforementioned Kistler patent. Furthermore, temperature and acceleration compensation may be provided as explained in such patent.

The charge output of a piezoelectric sensing element is at a high impedance level and requires a high quality, high impedance connection with the utilization circuitry. In some situations as where the transducer must be connected with utilization circuitry through a long cable, it is desirable to incorporate a semiconductor amplifier and impedance step-down circuit in the transducer housing as shown in Kistler U.S. Pat. No. 3,569,747.

FIGS. 4 and 5 illustrate different configurations of transducers embodying the invention. In FIG. 4 housing sleeve 40 is open at each end. Piezoelectric sensing element assembly 41 is located in a cup 42, the end wall 43 of which provides a portion of the end wall of the mounting sleeve. Rear end piece 44 is welded to the wall of cup 42 with the wall held under tension to exert a compressive preload on the piezoelectric sensing element assembly 41. An extension 45 on end piece 44 is threaded into body 47 which in turn is threaded into the housing sleeve 40. An outwardly extending, forwardly facing shoulder 48 on cup 42 engages an inwardly extending rearwardly facing shoulder 49 on the inner surface of sleeve 40. An inwardly extending flange 50 at the front end of sleeve 40 is welded to the periphery of the front end of cup 42. The flange 50 and end wall 43 of the cup form the end wall of the transducer.

Cable 52 has a conductor 53 connected with the piezoelectric sensing assembly 41, and extends rearwardly through a central passage in end piece 44 and body 47, terminating in a cable connection 54 at the rear of the transducer.

The outer flexure area is provided by flange 50 which is defined by an annular groove 56 in the inner wall of sleeve 40. The inner flexure area 57 in the end wall 43 of cup 42 is immediately inside the side wall of the cup and is defined by a groove 58 of circular cross-section on the inner surface of the end wall 43. The side wall of cup 42 rests on the body member 47 and provides the support means for the end wall, intermediate the two flexure areas.

In practice the transducer is preferabliy mounted in a stepped bore in the wall of the chamber within which the pressure to be measured is developed. A portion of the wall 60 is illustrated in FIG. 4 with a threaded bore 61 terminating in a flat bottom surface 62. A smaller bore 63 connects the chamber in which the pressure is developed with the small chamber 64 in which the pressure is applied over the entire end wall of the transducer. A Vee ring 65 on the forward end of mounting sleeve 40 forms a pressure tight seal with the flat bottom surface 62 of the main bore.

In a typical installation, the transducer mounting sleeve has a diameter of three-eighths inch with a length from the front face to the rear end of the mounting thread of the order of 0.6 inch. Threaded bore 61 has a depth of 0.56 inch, of which 0.5 inch is threaded, leaving a short unthreaded portion at the bottom, corresponding with the unthreaded forward end portion of the transducer mounting sleeve. Passage 63 has a diameter of the order of 0.06 inch and a length of 0.09 inch.

The transducer of FIG. 4 has multiple parts, presenting problems in manufacture and assembly. Furthermore, the threaded connection between body 47 and mounting sleeve 40, together with the weld between flange 50 and cup 42 must withstand the pressure applied to the end wall of the cup. In the event of an overpressure condition, these might fail resulting in destruction of the transducer and possible damage to other equipment of injury to personnel.

FIG. 5 illustrates a preferred transducer construction which obviates the problems noted with respect to FIG. 4. Threaded mounting sleeve 70 has recess 71 at the front end thereof which is open to the front. The piezoelectric transducer assembly 72 is located within a cup 73 which has an end wall 74 with an outwardly extending flange 75. The cup 73 is received in recess 71 of mounting sleeve 70 and is seated therein on forwardly facing, inwardly extending shoulder 77. End piece 76 is welded to the wall of cup 73 and holds the piezoelectric sensing assembly under compression.

Cup 73 is held within recess 71 by a retainer 79 threaded to end piece 76 and extending rearwardly through a bore 80 in mounting sleeve 70 with an enlarged head 81 which engages a rearwardly facing, inwardly extending shoulder 82 at the rear of the mounting sleeve.

Conductor 84 of cable 85 is connected with the piezoelectric sensing assembly 72 and the cable extends rearwardly through a bore 86 in retainer 79 to cable connector 87 at the rear of the transducer.

The outwardly extending flange 75 of the cup 73 is welded to the forward end of mounting sleeve 70, forming with cup end wall 74 the major portion of the end wall of the transducer. Flexure areas 89 and 90 in the end wall 74, and 91 in the wall of cup 73 are provided by a pair of annular grooves 92 and 93, both of generally circular cross-section. The wall of cup 73 rests on shoulder 77 and supports the end wall between the annular flexure areas 89, 90.

A replaceable double Vee sealing ring 95 is mounted on the forward end of sleeve 70 and may be of a very hard steel.

The transducer of FIG. 5 supports the entire pressure being sensed by the threads on the outside of mounting sleeve 70. The pressure applied to cup 73 and piezoelectric sensing assembly 72 is transmitted directly to shoulder 77. Furthermore, the construction of FIG. 5 has fewer parts than that of FIG. 4. It is assembled primarily from the front of the transducer sleeve and does not require the estensive interior threading and other finishing operations of the FIG. 4 construction.

As pointed out above, the transducers of FIG. 4 and 5 may include a semiconductor circuit providing a low impedance output if desired.

I claim:

1. A ballistic type piezoelectric fluid pressure transducer, comprising:
   a piezoelectric sensing element;
   a mounting sleeve surrounding said element and having a surface supporting said sensing element;
   an end wall secured across the end of said sleeve for exposure to a pressure to be measured, the central portion of the end wall transmitting pressure to said piezoelectric sensing element, the sensing element being held under compression between the supporting surface and end wall; and
   means supporting said end wall, between said central portion and said sleeve.

2. The piezoelectric pressure transducer of claim 1 in which said supporting means is spaced from both said piezoelectric sensing element and said sleeve.

3. The piezoelectric pressure transducer of claim 1 in which the compliance of said supporting means to deformation by pressure applied to the end wall is less than the compliance of said piezoelectric sensing element and greater than the compliance of said sleeve.

4. The piezoelectric pressure transducer of claim 1 in which a flexure area is provided in said end wall between said piezoelectric sensing element and said support means.

5. The piezoelectric pressure transducer of claim 1 in which a flexure area is provided in said end wall between the mounting sleeve and said support means.

6. The piezoelectric pressure transducer of claim 1 in which a flexure area is provided between said support means and said end wall.

7. The piezoelectric pressure transducer of claim 1 having a first flexure area in said end wall between said piezoelectric element and said support means and a second flexure area in said end wall between said mounting sleeve and said support means.

8. The piezoelectric pressure transducer of claim 7 having a third flexure area between said support means and said end wall.

9. The piezoelectric pressure transducer of claim 8 in which the compliance of said supporting means to deformation by pressure applied to the end wall is less than the compliance of said piezoelectric sensing element and greater than the compliance of said sleeve.

10. The piezoelectric pressure transducer of claim 1 wherein said piezoelectric sensing element is circular, said mounting sleeve is cylindrical and has an internal shoulder means therein facing the end of the sleeve, and said support means is a cylindrical wall resting on said shoulder means.

11. The piezoelectric transducer of claim 10 with an end piece secured to said support means wall providing said supporting surface for said piezoelectric sensing element which is between said end wall and said end piece, with the cylindrical support wall stressed longitudinally to maintain the piezoelectric sensing element under compression.

12. The piezoelectric transducer of claim 1 wherein the mounting sleeve has open front and rear ends, and including a cup with a wall forming said supporting means and the closed end forming a part of said end wall, said piezoelectric sensing element being located in said cup, an end piece secured to the open rear end of said cup, a carrier secured to said end piece and threaded into the rear end of said mounting sleeve, and a weld securing the cup wall to the front end of the mounting sleeve.

13. The piezoelectric transducer of claim 12 having an inturned flange at the front end of said mounting sleeve and secured to the periphery of said cup, said flange forming with the closed end of the cup the end wall of the transducer.

14. The piezoelectric transducer of claim 12 in which a rearwardly facing inwardly extending shoulder is located inside said mounting sleeve, said cup having forwardly facing outwardly extending shoulder which engages the shoulder inside the mounting sleeve.

15. The piezoelectric transducer of claim 1 wherein the mounting sleeve has an open front end, and including a cup with a wall forming said supporting means and the closed end forming a part of said end wall, said piezoelectric sensing element being located in said cup, an end piece secured to the open rear end of said cup, a forwardly facing, inwardly extending shoulder in said mounting sleeve, a retainer extending longitudinally forwardly through said sleeve engaging with said end piece to hold said cup against said shoulder, and a weld securing the cup wall to the front end of said mounting sleeve.

16. The piezoelectric transducer of claim 15 having an outturned flange at the closed end of the cup secured to the open end of said mounting sleeve, said flange and closed end forming the end wall of said transducer.

17. The piezoelectric transducer of claim 1 with an annular sealing ring on said mounting sleeve, outside said end wall.

* * * * *